United States Patent [19]

Shah et al.

[11] Patent Number: 4,522,544
[45] Date of Patent: Jun. 11, 1985

[54] HANDLING SHEETS OF MATERIAL

[75] Inventors: Ramesh C. R. Shah, Greater Manchester; Hugh J. Clare, Merseyside; Ronald F. Berry, Nr. Wigan, all of England

[73] Assignee: Pilkington Brothers p.l.c., St. Helens, England

[21] Appl. No.: 438,481

[22] Filed: Nov. 2, 1982

[30] Foreign Application Priority Data

Nov. 10, 1981 [GB] United Kingdom ............... 8133875

[51] Int. Cl.³ .................... B66C 1/24; B66C 1/34
[52] U.S. Cl. .................... 414/330; 294/67.21; 294/67.22; 414/739
[58] Field of Search ........ 294/67 AA, 67 AB, 67 BC; 414/115, 330, 114, 739, 753

[56] References Cited

U.S. PATENT DOCUMENTS

| 1,753,578 | 4/1930 | Raymond | 294/67 AB |
| 3,751,097 | 8/1973 | Jones et al. | 294/67 AA X |
| 3,976,321 | 8/1976 | Dean | 294/67 BC X |
| 3,998,488 | 12/1976 | Durgan | 294/67 AA |

FOREIGN PATENT DOCUMENTS

| 647227 | 2/1979 | U.S.S.R. | 294/67 AB |
| 742153 | 7/1980 | U.S.S.R. | 414/330 |
| 821383 | 4/1981 | U.S.S.R. | 294/67 BC |

Primary Examiner—Robert J. Spar
Assistant Examiner—Janice Krizek
Attorney, Agent, or Firm—Burns, Doane, Swecker & Mathis

[57] ABSTRACT

A sheet handling device has lower support arms and upper support arms. The lower support arms are provided with extension members which provide further support for the back sheet of the batch which is being moved. The main use of the sheet handling device is to separate a batch of sheets from a stack or add a batch to a stack of sheets, both speedily and safely thereby making it more practical for larger stacks of sheets to be stored and transported.

9 Claims, 12 Drawing Figures

HANDLING SHEETS OF MATERIAL

BACKGROUND OF THE INVENTION

The invention relates to a sheet handling device for handling sheets of material, for example sheets of glass and to a method of moving a vertically supported batch of sheets.

Sheets of material are normally formed into a stack so that they can be conveniently handled. In one form of stack they are arranged in face-to-face relationship with the faces of adjacent sheets substantially vertical and in contact with one another. The number of sheets in any one stack is set so that the size of the stack does not exceed the handling capabilities of a stack handling device. In order to conserve space in the warehouse it is convenient to stand the stacks in line with spacers between adjacent stacks. The spacing between adjacent stacks enables the stack handling device to lift stacks individually and convey them away without disturbing other stacks in the line.

In operation a stack handling device having lower and upper pairs of support feet and arms mounted on vertical stanchions is moved towards a stack of sheets vertically mounted on a rack or pallet until the bottom support feet extend under and beyond the stack. The upper arms are then lowered towards the top of the stack, and have at their ends depending projections which locate behind the top edge of the back sheet in the stack to act as a support for the sheets in a horizontal direction. The bottom support feet can then be raised to lift the stack away from its rack or pallet and convey the stack elsewhere. During the lifting and conveying operation the stack of sheets is supported vertically from beneath by the bottom support feet and in a horizontal direction by the projections depending from the upper arms.

This stack handling device has certain limitations. For example, although it can be used for lifting individual stacks away from an array of stacks standing in line at spaced intervals it cannot safely be used to move a stack whose back sheet, i.e. the sheet remote from the main body of the stack handling device, is in face-to-face contact with a substantially vertical support surface which will not allow the bottom support feet to extend beyond the back sheet. For example the substantially vertical support surface may be a wall against which the back sheet is leaning. Furthermore, it is not practical to use the known sheet handling device for lifting a batch of sheets which form a part of a stack of sheets.

The substantially vertical support surface for the back sheet of the batch is another sheet in the remainder of the stack which is in face-to-face contact with the back sheet in the batch. To attempt to lift a batch of sheets could result in considerable damage to the sheets and could also be a considerable safety hazard.

This is a problem when handling stacks of glass sheets and a glass sheet has broken somewhere within a stack. The broken sheet must be removed before the stack can be transported. The broken glass sheet can be reached by using a suction device employing a plurality of suction heads which by suction lift the glass sheets off and away from the stack one at a time, until the broken sheet is reached. Such an operation is very time consuming and laborious.

Furthermore, because the known sheet handling device has limited sheet handling capabilities the stacks of sheets have to be restricted in depth and adjacent stacks have to be spaced apart to an extent such that one stack can be lifted and conveyed away without interfering with other stacks. This is a constraint on the quantity of sheets which can be transported at any one time, for example in a truck or railwagon. There is, therefore, a need to be able to transport larger stacks of sheets and to provide a handling device which can split larger stacks into a variety of smaller stacks of a size or sizes dictated by customers.

BRIEF SUMMARY OF THE INVENTION

According to the invention there is provided a sheet handling device for moving a batch of sheets relative to a stack of vertically supported sheets, comprising lower support means for supporting the lower edges of the batch, upper support means for engaging the back sheet of the batch to maintain the batch substantially vertical, and means for moving the lower support means in order to move the batch relative to the stack, characterised in that at least one of the upper and lower support means includes sheet-engaging extensions arranged to be extended beyond the supported batch.

For separating a batch of sheets from a stack of sheets the lower support may have extension members arranged to be extended beyond the back sheet of the batch as a separated batch is transported away from the stack.

The extension members may be spring-loaded arms or pivotally mounted extensions.

A rolling pivot may be provided at the top of the device for suspending the device from a crane, with control means for adjusting the position of the support means relative to the pivot. Further, according to the invention there may be adjustable support brackets, which can be advanced or retracted, for supporting the front sheet of a batch.

The invention also provides a method of moving a vertically supported batch of sheets employing a sheet handling device, in which the lower edges of the batch of sheets are supported, at least the back sheet of the batch is engaged to maintain the batch substantially vertical, and the batch of sheets is separated from or added to a stack of sheets, characterised by providing additional support for the back sheet of the batch while it is moved in a horizontal direction away from, or towards the stack of sheets.

For separating a batch of sheets from a stack the method is characterised by initially moving the batch vertically relative to the stack to free an edge of the back sheet of the batch from the stack, engaging that free edge while providing said additional support for the back sheet of the batch, and then separating the batch in a horizontal direction from the stack.

For adding a batch of sheets to a stack the method is characterised by retracting the additional support for the back sheet of the batch during the final horizontal movement of the batch towards the stack, and then lowering the batch relative to the stack.

BRIEF DESCRIPTION OF THE DRAWINGS

Some embodiments of the invention will now be described, by way of example, with reference to the accompanying drawings in which.

DETAILED DESCRIPTION

Figure 1:
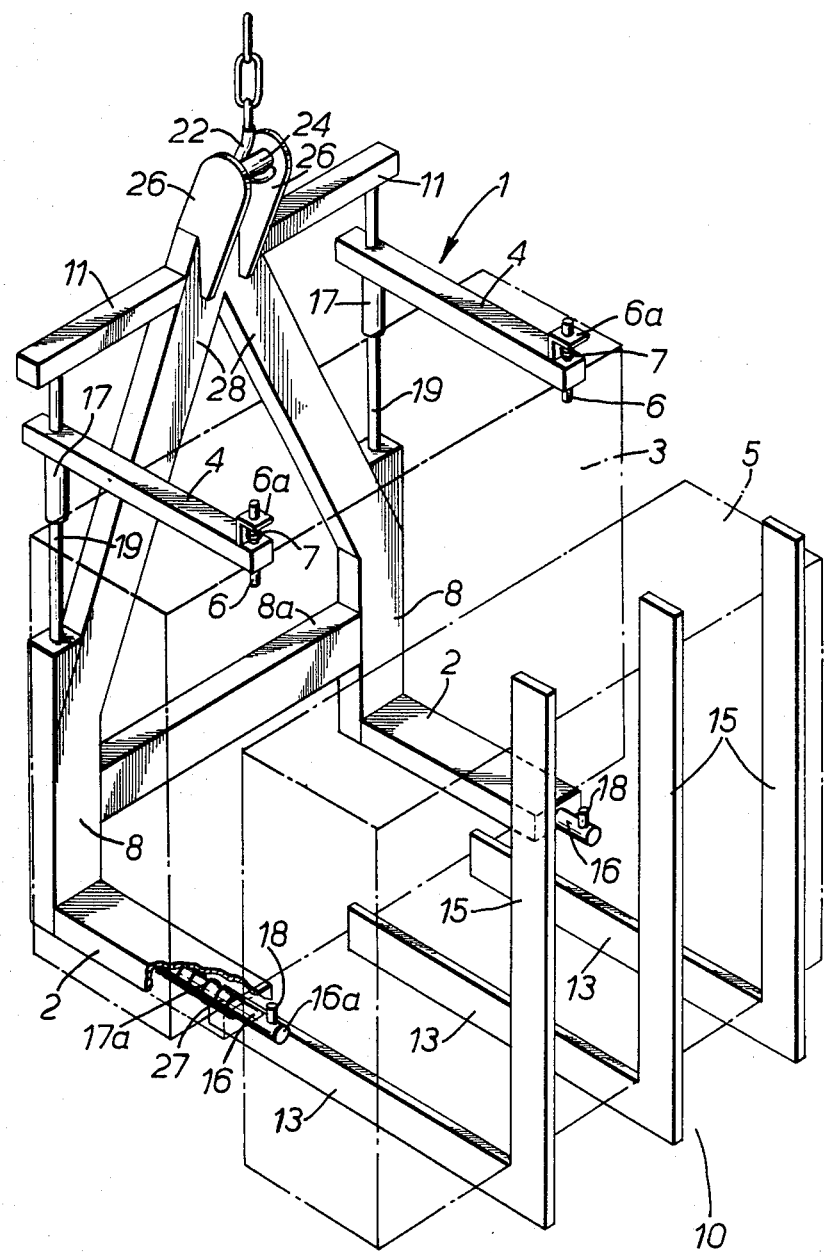
FIG. 1 is a perspective view of a stack handling device according to the invention for handling glass sheets by separating a batch of flat glass sheets from a stack of flat glass sheets.

FIG. 1 shows a handling device for handling a stack of sheets relatively to a substantially vertical support surface. The stack handling device indicated by reference 1, is being used to separate a batch of substantially vertical flat glass sheets 3 from a stack of substantially vertical flat glass sheets 5. The stack 5 is supported on an L-shaped rack 10 having three substantially horizontal feet 13 which are spaced apart, and three substantially vertical stanchions 15. The glass sheets in the stack 5 lean towards the vertical stanchions 15 and are, for example, inclined to the vertical by an angle of about 7°.

The sheets to be handled can be flat glass sheets or curved glass sheets as for example are used for car windscreens, or of other rigid material, for example plastics or hardboard.

The sheet handling device 1 has a bottom pair of substantially horizontal feet 2 serving as a lower support for the batch 3. The spacing between the horizontal feet 2 is such that they can pass between the feet 13. The feet 2 are integrally formed on the bottom ends of a pair of substantially vertical stanchions 8 which are themselves integrally connected to one another by a cross bar 8a. Integrally mounted on the upper portions of the vertical stanchions 8 are two diagonally extending stanchions 28 which converge together in an upward direction to form an apex. Integrally mounted on each of the stanchions 28 at the apex is a respective vertical flange 26.

The flanges 26 are spaced apart and carry between them a horizontal bar 24 beneath which is located a lifting hook 22 of a crane.

A pair of cylindrical bars 19 extend upwardly from the top ends of stanchions 8 to respective horizontal cross pieces 11 which are each connected between the top end of one of the bars 19 and the apex formed by the stanchions 28.

The sheet handling device also includes a pair of substantially horizontal upper arms 4. One end of each arm is mounted at the top of a collar 17, and each arm 4 with its collar 17 is slidably mounted on one of the bars 19. The collars 17 and arms 4 have no means for clamping them to the bars 19 and when there is no glass below the arms 4 they will freely slide under gravity down the bars 19 until the collars rest on the tops of the stanchions 8.

In order to raise the arms 4 the operator uses a pair of rods, not shown, each rod having a handle at one end which can be held by the operator, the other end of each rod being attached to the respective collar 17.

Figure 5:
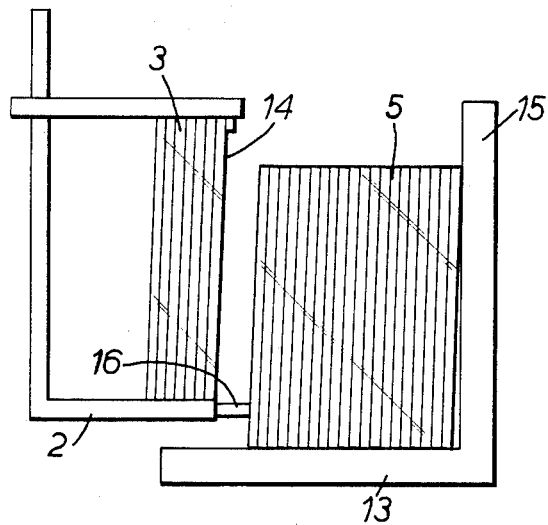

Each of the arms 4 carries at its end remote from the bar 19, an extensible spring loaded finger 6, which can be cylindrical as shown or can be in the form of a flat plate. The fingers 6 serve as downwardly depending projections for engaging the face of a back sheet of glass 14, FIG. 5, of a batch of sheets, in order to support the glass sheets in the batch in a horizontal direction.

In the embodiment illustrated each finger 6 is a small cylindrical bar which extends through a hole in the end of the arm 4 and through a hole in the top of an inverted L-shaped bracket 6a mounted on the top surface of the end of arm 4. A spring 7 is located in the space between the bracket 6a and the top end surface of the arm 4. The spring 7 is attached to the finger 6 in that space so as to bias the finger 6 downwardly.

Through the centre of each foot 2 passes a substantially horizontal rod 27 whose end portion serves as an extension arm 16. A compression spring 17a is attached to the rod 27, which spring biasses the rod 27 in a direction outwardly from the end of the foot 2. The rod 27 is located coaxially within a hollow cylindrical sleeve, not shown, having two slots in its cylindrical surface. One slot is disposed longitudinally and has a length corresponding to the fully extended length of extension arm 16. The second slot is disposed at right angles to the longitudinal slot and intersects the longitudinal slot at its end remote from the extension arm 16. The rod 27 has a projection, not shown, which is perpendicular to the axis of the rod and extends through the slots in the sleeve.

The rod 27 also has a handle, not shown, extending outwardly through the side of the foot 2, by means of which an operator can pull and twist the rod 27 along and about its axis.

When the projection on the rod 27 is located in the second slot in the sleeve, the spring 17a is compressed and the end 16a of the extension arm 16 is flush with the end of the foot 2. In order to release the spring 17a and extend the extension arm 16 the operator grasps the handle and pulls the rod slightly back against the force of the spring 17a and twists the rod until its projection reaches the end of the longitudinal slot in the sleeve. When the handle is then released the spring 17a forces the extension arm 16 outwardly until the projection on rod 27 reaches the other end of the longitudinal slot in the sleeve. In order to retract the extension arm 16 the operator pulls the rod 27 back as far as he can against the biassing action of the spring 17a and then twists the rod 27 so that its projection is located in the second slot of the sleeve.

The extension arms 16 are covered with rubber to prevent damage to the back sheet 14 and to reduce the drop from the feet 2 to the extension arms 16.

An additional safety feature in the form of an extension piece 18 can be provided on the end of each extension arm 16. The extension pieces 18 can be rotated from a horizontal into a vertical position once the feet 2 are fully extended and so act as an additional safety device to prevent the glass from falling off the extension arms 16.

To enable this to be done a further slot is provided in the cylindrical sleeve at right angles to the longitudinal slot and intersecting the longitudinal slot at its end nearest the extension arm 16. When the extension arms 16 are fully extended the operator turns the rod 27 through 90° about its axis and the projection on the rod 27 engages in the further slot. The end portions of feet 2 have to be partially cut away to accommodate those extension pieces 18, so as to permit the extension arms 16 to be fully retracted.

The bottom pair of feet 2 and upper pair of arms 4 are shown in FIG. 1 schematically without any means for adjusting their length. In practice it is preferable that their lengths should be adjustable and any suitable mechanical or pneumatic means can be adopted. For example, each arm or foot can be made up from two box section pieces of slightly different cross-sectional areas which can be telescoped together, and a screw mechanism provided for sliding them in and out relative to one another. Each box section piece can also be provided with a series of spaced holes along its length so that a locating pin can be passed through aligned pairs of holes for holding the box section pieces together in a fixed position relative to one another.

The sequence of operations involved in using the sheet handling device decribed above for separating a batch of seven glass sheets from a stack of glass sheets will now be described.

Figure 2:
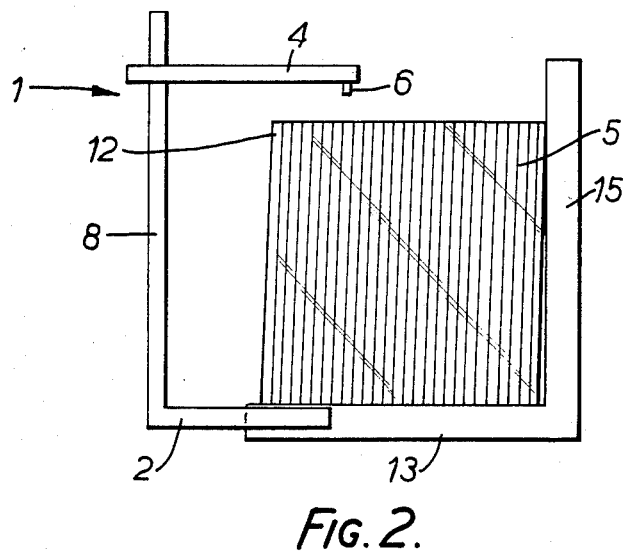
FIGS. 2 to 7 illustrate schematically the sequence of operations carried out by the stack handling device of FIG. 1 for separating a batch of flat glass sheets from a stack.

Referring to FIG. 2 an operator first raises the pair of arms 4 to a position above the level of the glass in the stack 5 by pushing the collars 17 up along the rods 19. The glass handling device 1 is then brought into position with its feet 2 underneath and slightly spaced below the glass stack 5. The length of the feet 2 extending under the stack 5 corresponds approximately to the total depth of the batch of seven sheets to be removed.

Figure 3:
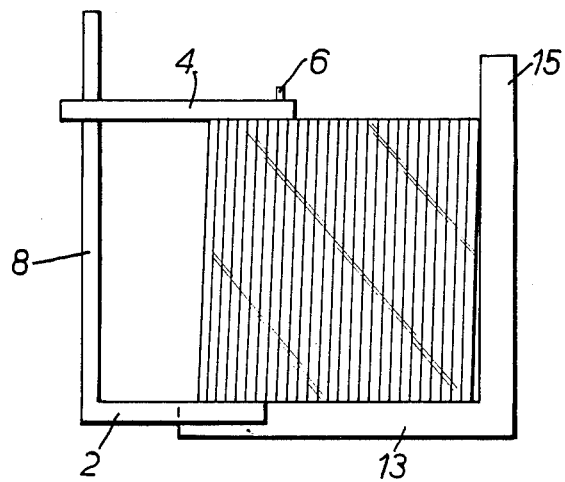

The sheet handling device is then raised slightly until the feet 2 engage the bottom edges of the seven glass sheets. At this point the operator allows the collars 17 to slide slowly down the rods 19 until the arms 4 rest on top of the batch of seven glass sheets to be removed. As shown in FIG. 3 the fingers 6 are pushed by the glass upwardly against the downward biassing force of their associated springs 7.

Figure 4:
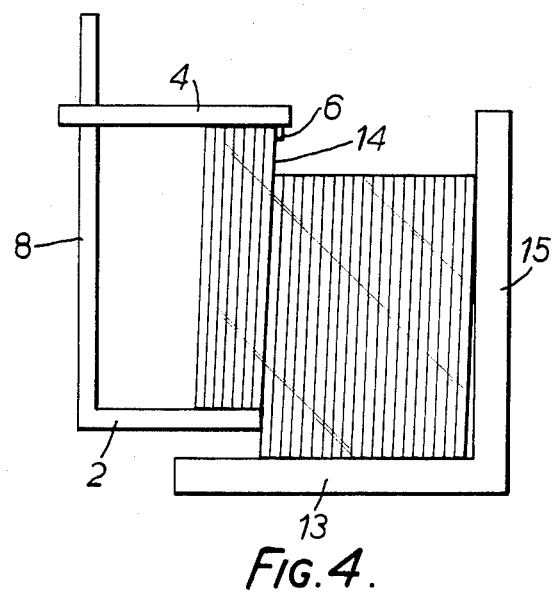

The next stage of the removal operation is to lift the seven glass sheets vertically relative to the other glass sheets in the stack 5, as shown in FIG. 4. The crane raises the sheet handling device a small distance, for example 50 mm, so lifting the seven sheets so that their top edges are clear of the remaining sheets in the stack 5. The seven glass sheets of the batch are still supported horizontally by the remaining glass sheets of the stack 5. The fingers 6 are no longer in contact with glass directly beneath them and are free to locate behind the top rear face of the back glass sheet 14 of the batch.

The back sheet 14 is supported on the very edges of the feet 2 and there is a danger that the back sheet 14 will slip off those edges as the handling device is moved horizontally away from the stack, but the extension arm 16 of each foot 2 provides further support for the back sheet 14 if the back sheet 14 slips off the edges of feet 2.

Before the crane slowly moves the sheet handling device horizontally away from the remaining glass sheets in the stack 5, the operator twists the rods 27 so as to move the projection on each rod 27 into line with the longitudinal slot on the surrounding sleeve. The extension arms 16 can then protrude forwardly from the feet 2 and remain in contact with the remaining glass in the stack during initial backwards movement of the sheet handling device, for example for the first 15 mm of backwards movement, so creating a safety ledge for back sheet 14.

Figure 6:
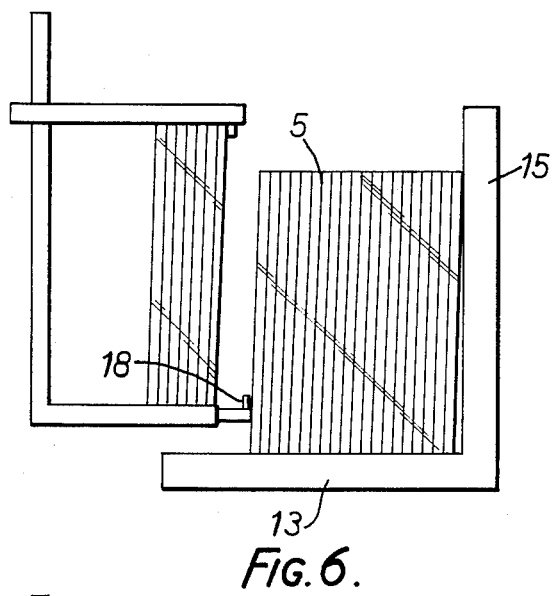

When the extension arms 16 are fully extended, the operator can twist the rods 27 again to rotate the extension pieces 18 from a horizontal to a vertical position as shown in FIG. 6. The extension pieces 18 act as additional safety devices to prevent the glass from falling off the extension arms 16.

Figure 7:
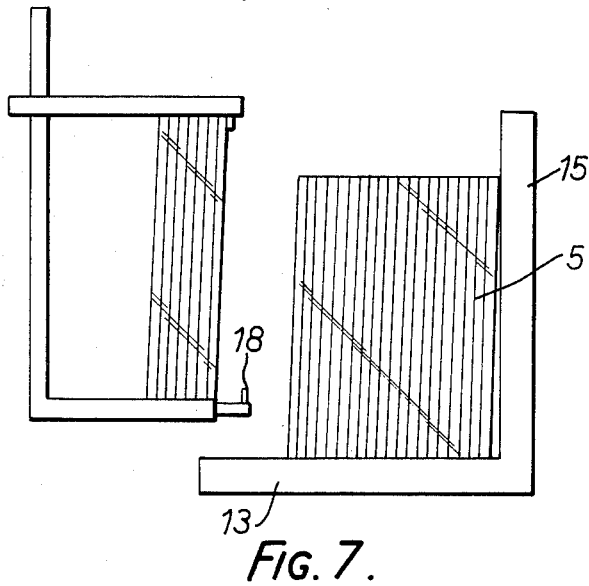

The batch of seven sheets can then be conveyed away as shown in FIG. 7.

The sheet handling device described above can also be used for adding glass sheets to an existing stack of glass sheets. The adding operation involves essentially the same steps in reverse as the unloading operation described above.

It it is required to add seven sheets of glass to an existing stack of glass sheets 5, FIG. 7, the first step is to use the crane to bring the sheet handling device into the position shown in FIG. 6. Each extension piece 18 is then rotated to a horizontal position so that the projection on each of rods 27 comes into alignment with the longitudinal slot in the surrounding sleeve. Then the crane can move the glass handling device and its seven glass sheets substantially horizontally towards the stack of sheets already on the feet 13. The extension arms 16 retract until the ends of the feet 2 and the sheet of glass 14 are flush against the existing stack of glass 5, FIG. 4. The crane then lowers the sheet handling device to the position shown in FIG. 3, and the fingers 6 are pushed upwardly against the force of their biassing springs by the stacked glass 5. Finally, the arms 4 are raised by the operator and the sheet handling device can be swung horizontally away by means of the crane.

The sheet handling device can be part of a modified fork lift truck.

Figure 8:
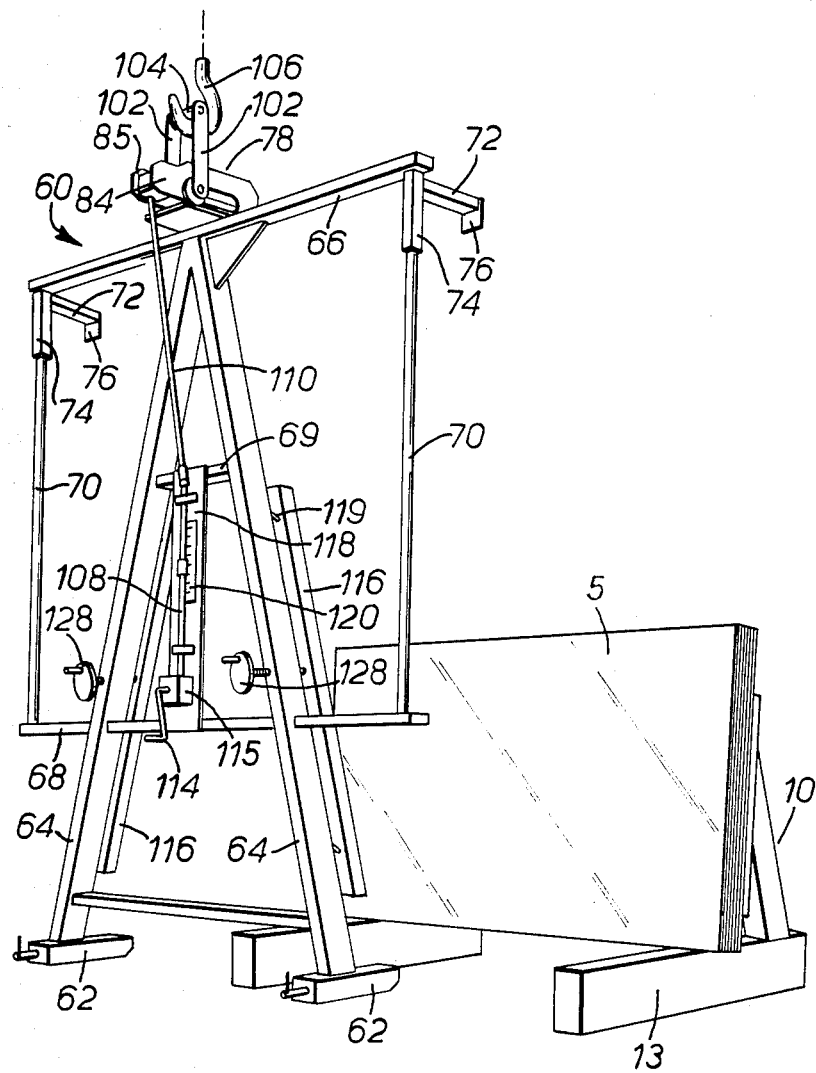
FIG. 8 is a perspective view of another embodiment of a stack handling device according to the invention.

FIG. 8 illustrates a preferred form of sheet handling device according to the invention, which is indicated by the reference 60. This device is more versatile and easier to operate than the sheet handling device illustrated in FIG. 1. The sheet handling device 60 is shown suspended relative to a stack 5 of substantially vertical flat glass sheets supported on the rack having substantially horizontal feet 13.

The sheet handling device 60 has a bottom pair of horizontal feet 62 which serve as a lower support for a batch of glass sheets to be removed from the rack 10. The feet 62 are formed integrally on the bottom ends of two diagonally extending stanchions 64 which converge together in an upward direction to form an apex. Two spaced horizontal cross pieces 66 and 68 are carried by the stanchions 64 and a pair of vertical cylindrical bars 70 extend between the ends of the cross pieces 66 and 68.

The handling device has horizontal upper arms 72 each mounted at the upper end of a collar 74 which is slidable on one of bars 70. Each of the arms 72 has, at its end remote from the bar 70, a depending plate 76 for engaging the back sheet of the batch of glass to be carried.

Figure 10:
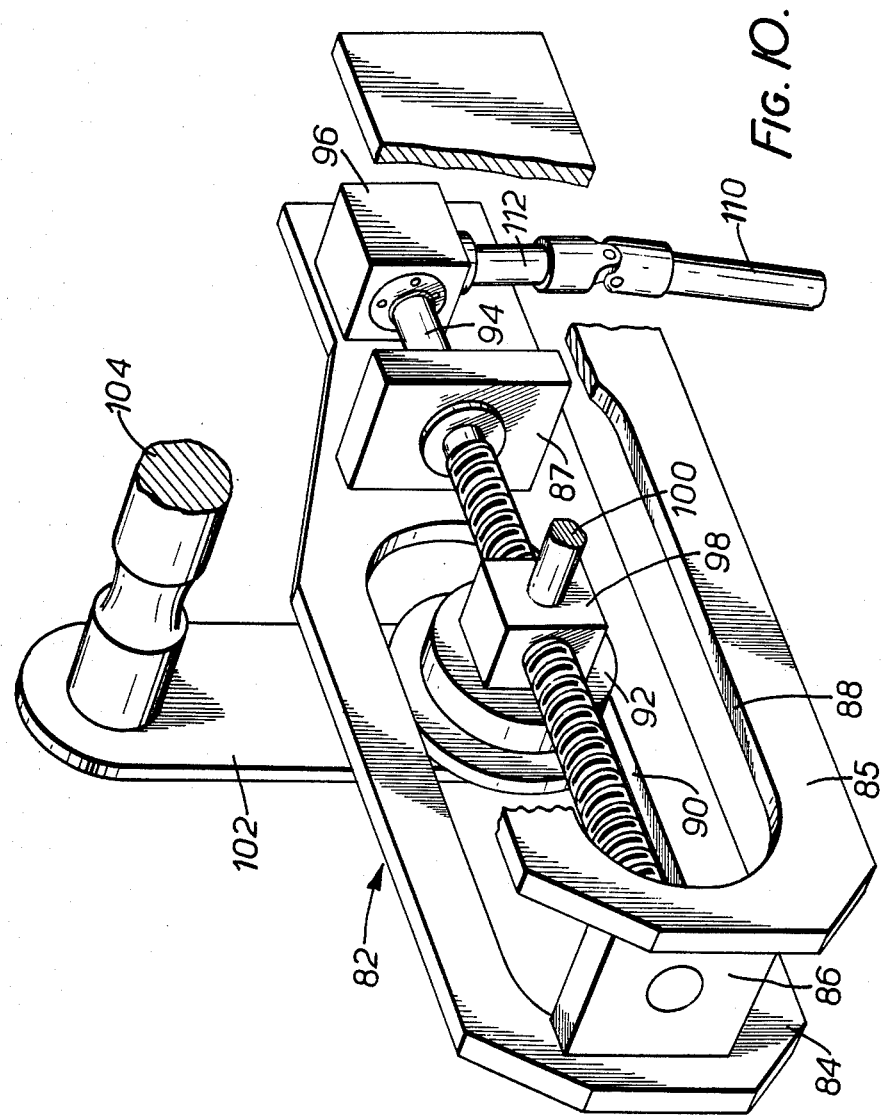
FIG. 10 is a detailed perspective view of a pivot assembly of the stack handling device of FIG. 8.

There is a pivot assembly immediately above the apex formed by the stanchions 64, and carried on top of the centre portion of the cross piece 66. The pivot assembly 78 is shown in more detail in FIG. 10 and consists of an open housing 82 having two side walls 84 and 85 and two end walls 86 and 87. The side walls 84 and 85 both have a slot cut away to define flat guide surfaces 88 and 90 on each of which a roller 92 can roll. Only one roller 92 is shown.

The rollers 92 are rotatably mounted on axles 100 which extend between the bottom portions of spaced flanges 102 and a central block 98. A lifting bar 104 extends between the upper portions of the flanges for engagement by a lifting hook 106 hanging from a gantry crane.

The mechanism for moving the rollers 92 along the guide surfaces 88 and 90 comprises a rotatable shaft 94 which extends between the end walls 86 and 87. One end of the shaft 94 is carried by a journal bearing in the wall 86 and the other end extends into a gear box 96. The major portion of shaft 94 extends between the end walls 86 and 87 and it is threaded and passes through a threaded cylindrical hole in the block 98.

Rotation of the shaft 94 moves the main part of the handling device relative to the flanges 102 and the bar 104. The control device for rotating the shaft 94 comprises a series of rotatable connecting rods 108, 110 and 112 which are joined together at their adjoining ends by universal couplings. The end of connecting rod 112 passes into the gear box 96 where it is coupled to the end of shaft 94 by bevel gears. The connecting rod 108 is rotated manually by means of a handle 114 and associated bevel gearing contained in a housing 115 which is mounted at the bottom of a flat sheet of metal 118 extending between the cross piece 68 and a cross piece 69.

A calibrated scale 120 and a pivot position indicator are also attached to the sheet of metal 118. The operator knows the weight of the glass sheets to be lifted and turns the handle 114 until the rollers 92 are in their correct position as indicated on the scale 120.

The handling device of FIG. 8 also has a pair of supporting brackets 116 for supporting the front face of the sheet of the batch to be removed. The brackets 116 are carried on and run parallel to the stanchions 64. Supporting rods 119 pivotally attached to the stanchions 64 link the stanchions 64 with the supporting brackets 116 enabling the supporting brackets 116 to be moved towards and away from the stanchions 64. The position of each of the supporting brackets 116 relative to the stanchions 64 is adjustable by means of an adjusting screw arrangement 128.

Figure 9:
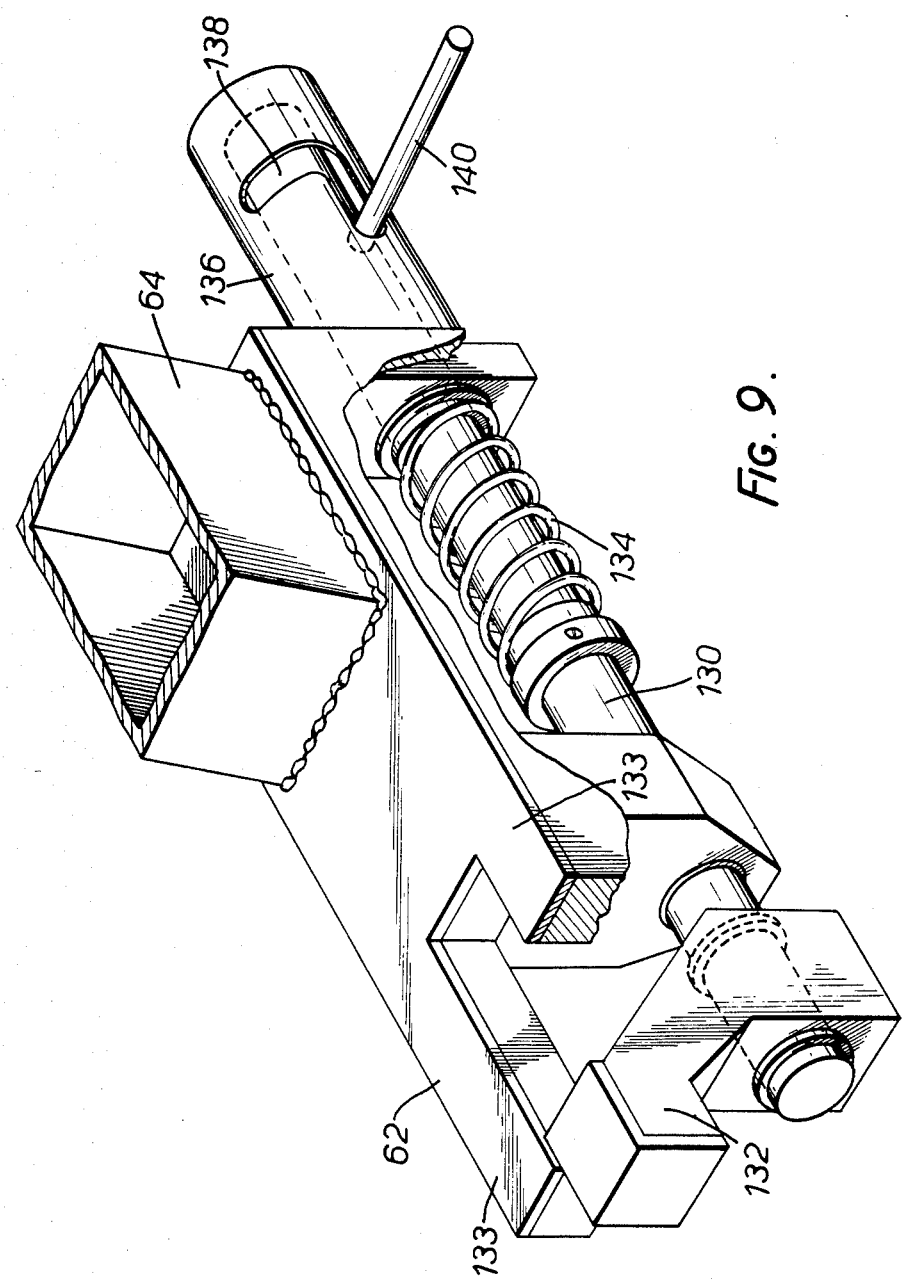
FIG. 9 illustrates in detail a lower support of the stack handling device of FIG. 8.

A foot 62 of the sheet handling device of FIG. 8 is shown in more detail in FIG. 9. A rod 130 is mounted through the centre of the foot 62 and an extension bracket 132 is attached to one end of the rod 130. The extension bracket 132 is located between foot sections 133 at the bifurcated end of the foot 62. The rod 130 is biassed in a direction outwardly from the end of the foot 62 by means of a compression spring 134. A portion of the rod 130 is located co-axially within a hollow cylindrical sleeve 136 the sleeve having an L-shaped slot 138 formed in its cylindrical surface. The rod 130 has a projection handle 140 extending through the slot 138 perpendicular to the axis of the rod 130. In the position shown in FIG. 9 the spring 134 is in its released position and the extension bracket 132 is extended beyond the ends of the foot sections 133. To retract the extension member 32 so that it is flush with the ends of foot sections 133 the handle 140 is pulled back until it is located into the end of slot 138.

Operation of the sheet handling device of FIG. 8 is similar to the operation of the device of FIG. 1. The additional facility of an adjustable pivot position by control of the pivot assembly 78, enables the operator to control the position of the centre of gravity of the sheet handling device with its load, and thereby makes the glass handling operation quicker and safer. The supporting brackets 116 also provide additional support for the glass sheets during the removal or adding operation making it quicker and safer.

The sequence of operations using the sheet handling device 60 of FIG. 8 for separating a batch of glass sheets from a stack of glass sheet will now be described.

The operator first checks that the upper arms 72 are in the raised position and that the spring loaded extension brackets 132 are fully retracted and locked. The screw arrangements 128 are operated so as to adjust the supporting brackets 116 to the required depth of the batch to be removed. The sheet handling device 60 is then moved towards the stack 5 until the feet are below the stack 5 and the supporting brackets 116 contact over their full length the front sheet of the stack 5. The upper arms 72 are lowered until the depending plates 76 rest on top of the stack and are positioned so as to extend behind the back sheet of the batch to be removed.

The sheet handling device 60 is lifted by means of the overhead crane by approximately 30 mm and the number of sheets which have been lifted checked by the operator. If an incorrect number of sheets has been lifted or if there are an unequal number of sheets lifted at either side of the stack then the batch of sheets is lowered and one or both of the supporting brackets 116 re-adjusted. When the correct number of sheets for the batch has been lifted the spring loaded extension brackets 132 are released and the glass handling device lifted until the plates 76 are clear of the sheets remaining in the stack 5. Each of the spring loaded extension brackets 132 is then locked by rotating its handle 140 through 90° into a slot, not shown, provided in the sleeve 136 at right angles to the slot 138 at its end nearest the extension bracket 132. The glass handling device 60 is then withdrawn from the stack 5 carrying away the batch of sheets.

The various operations involved in using the sheet handling device 60 of FIG. 8 to add a batch of sheets to an existing stack of sheets 5 will now be described.

Firstly the glass handling device 60 and the batch of glass sheets which it carries are moved towards the stack 5, at a height where the plates 76 of the upper arms 72 are above the top of the stack 5, until the spring loaded extension brackets 132 contact the front sheet of the stack 5. The spring loaded extension brackets 132 are then unlocked from their extended position by rotating the handle 140 through 90°. The handling device 60 is traversed towards the stack 5 until the supporting bracket 116 are in contact with the front sheet of the carried batch and then manual pressure is applied at the base of the handling device 60 to retract the spring loaded extension brackets 132. The handling device 60 is then lowered until the glass sheets of the batch are re-positioned on the feet 13 of the rack 10 and the feet 62 are clear of the bottom of the stack 5. The upper arms 72 are raised and the spring loaded extension brackets 132 are retracted and locked in their retracted position. The glass handling device 60 is then withdrawn horizontally away from the stack 5.

Figure 11:
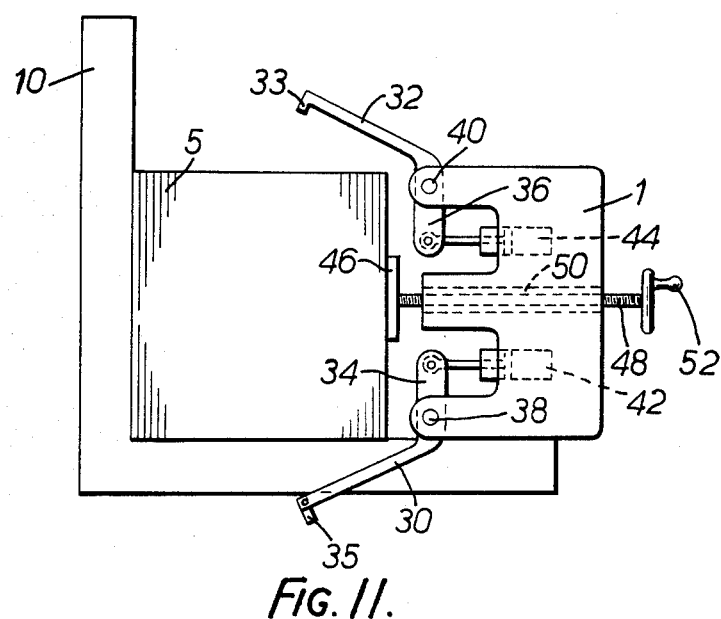
FIG. 11 is a schematic side elevation of another embodiment of the invention with sheet support arms in an open position.
Figure 12:
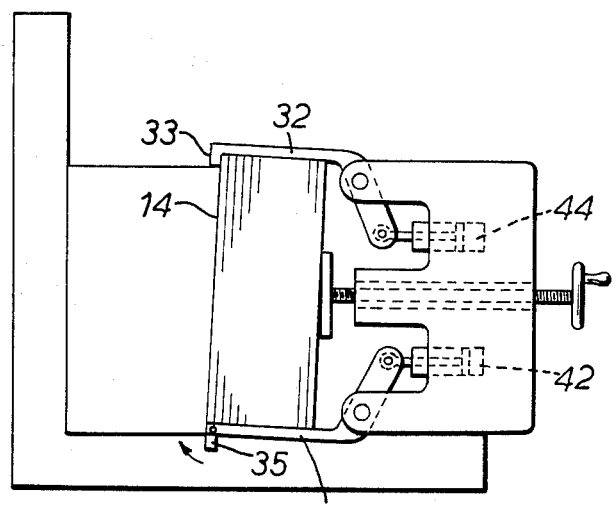
FIG. 12 is a view similar to FIG. 11 with the support arms closed on to a batch of glass sheets.

In the embodiment shown in FIGS. 11 and 12, the sheet handling device has upper supports which are arms 32 of bell crank levers having shorter arms 36 and which are mounted on a pivot 40. Each of the upper arms 32 has an integral downward projection 33 at its end. Each arm 36 is connected to a piston rod of a piston and cylinder assembly 44. The lower supports for the sheets are the longer arms 30 of bell crank levers having shorter arms 34 and which are mounted on a pivot 38. Each lower arm 30 has an extension piece pivotably connected to its end. Each arm 34 is connected to a piston rod of a piston and cylinder assembly 42.

A resilient spacing member 46 is attached to one end of a cylindrical rod 48 extending along a cylindrical bore formed through the body of the glass handling device 1. The rod 48 and bore 50 have complementary threads so that by turning a handle 52 attached to the other end of rod 48 the position of the spacing member 46 can be adjusted.

In operation the spacing member is first adjusted to a position, which can be calculated, such that the depth of the glass sheets in the batch to be removed is equal to the distance between the spacing member 46 and the end of the arms 30 when in a horizontal disposition as in FIG. 12. When both the piston rods are extended the arms 30 and 32 are opened as shown in FIG. 11 and the extension pieces 35 hand at an angle of 90° in a downward orientation relative to the lower arms 30. The handling device 1 is advanced towards the stack of glass sheets 5 on the L-shaped rack 10 until the spacing member 46 comes into contact with the front sheet of the stack 5. The piston rod of the piston and cylinder assembly 42 is then retracted. Further retraction of the piston rod causes the supports 30 to lift the batch of glass sheets relative to the rest of the stack, for example by 2 cms as shown in FIG. 12.

The piston rod of the piston and cylinder assembly 44 is then retracted to cause anti-clockwise rotation of the arms 32 about pivot 40 until the arms 32 rest on top of the batch of sheets with the downward projections 33 located behind the top edge of the back sheet 14 of the batch. The sheet handling device 1 can be withdrawn to remove the batch away from stack 5, and as this occurs the extension piece 35 is pivoted by means of a spring loaded mechanism, not shown, or alternatively by pneumatic or hydraulic means, in a clockwise direction until it is parallel with the lower arm 30. In this way the extension piece 35 acts as an additional safety ledge for the back sheets of glass 14. The extension piece 35 could be an extensible arm or foot like that described in the embodiments of FIG. 1 and FIG. 8.

The glass handling device of FIGS. 11 and 12 can also be used for adding glass sheets to an existing stack of glass sheets, the loading operating involving essentially the same steps as the unloading operation in reverse.

In the embodiments described the upper arms have depending members at their ends to engage behind the top edge of the back sheet of the batch so as to constrain the sheets in the batch from moving in a horizontal direction. The glass sheets in the batch can be constrained from moving in a horizontal direction by arranging for the upper arms to engage frictionally with the top edge of the back sheet or the top edges of at least several sheets including the back sheet. The arms may be arranged so as to engage and press against the side edges of the sheets in the stack or batch, and those arms can provide the horizontal constraint for the sheets, either by themselves or with the assistance of additional top arms.

In the embodiments described the batch of sheets is lifted relative to the sheets in the remainder of the stack. The present invention also envisages lowering the lower supporting feet of the glass handling device, and hence the batch of sheets, relative to the sheets remaining in the stack. For this purpose the upper arms may be provided with an extension member for engaging behind the back sheet of the batch so as to act as a support for the sheets in the batch in a horizontal direction, the extension member engaging behind the back sheet as the batch of sheets move horizontally away from the sheets remaining in the stack. The lower supports would be arranged to extend beyond the total depth taken up by the bottom edges of the sheets in the batch.

We claim:

1. A sheet handling device for moving a batch of sheets relatively to a stack of vertically supported sheets, comprising lower support means for supporting the lower edges of the batch, upper support means for engaging the back sheet of the batch to maintain the batch substantially vertical, and means for moving the lower support means in order to move the batch relatively to the stack, and wherein said lower support means includes slidable extension means for extending the length of the lower support means as a batch is separated horizontally from a stack.

2. A sheet handling device according to claim 1, wherein the lower support means comprises support feet, and said slidable extension means comprises spring-loaded arms which protrude forwardly from the support feet.

3. A sheet handling device according to claim 1 or claim 2, wherein the upper support means is adapted to engage frictionally the back sheet of a batch so as to constrain that sheet.

4. A sheet handling device according to claim 3, wherein for constraining the back sheet the upper support means is adapted to engage frictionally at least the top edge of the back sheet of a batch.

5. A sheet handling device according to claim 1, including a rolling pivot at the top of the device, for suspending the device from a crane, and control means for adjusting the position of the support means relative to the pivot.

6. A sheet handling device according to claim 5, wherein the control means includes a pivot position indicator having a scale which is calibrated to indicate the position of the support means relative to the pivot.

7. A sheet handling device according to claim 1, including at least one support bracket for supporting the front sheet of a batch, which support bracket is carried by stanchions which connect the upper and lower support arms.

8. A sheet handling device according to claim 7, wherein each support bracket is carried by adjustable means for advancing or retracting the bracket relative to one of the stanchions.

9. A sheet handling device for moving a batch of sheets relatively to a stack of vertically supported sheets, including
   upwardly pivotable levers for engaging the lower edges of a batch of sheets,
   pivoted extension means mounted at the end of each said upwardly pivotable lever and operable to extend horizontally at the end of each lever when a batch of sheets is supported on said upwardly pivotable levers to provide a safety extension at the end of each lever,
   means for pivoting said upwardly pivotable levers to a sheet engaging position and then further pivoting said levers to lift the batch of sheets,
   spacing means mounted to engage the front sheet of a batch of sheets,
   an adjustable mounting for said spacing means for adjusting the distance of the spacing means from the ends of said levers to determine the number of sheets in a batch,
   downwardly pivotable upper support levers each having means for engaging at least the back sheet of the batch, and
   means for pivoting said upper support levers downwardly so as to engage at least the back sheet of the batch when it is separated from the stack.

* * * * *